United States Patent
Yang

(10) Patent No.: US 6,412,513 B1
(45) Date of Patent: Jul. 2, 2002

(54) VALVE HAVING AN EASILY SEALING CONFIGURATION

(76) Inventor: Tsai Chen Yang, P.O. Box 63-99, Taichung (TW), 406

( * ) Notice: Subject to any disclaimer, the term of this patent is extended or adjusted under 35 U.S.C. 154(b) by 0 days.

(21) Appl. No.: 09/723,135

(22) Filed: Nov. 23, 2000

(51) Int. Cl.[7] .......................... F16K 27/04; G05D 11/03
(52) U.S. Cl. ............. 137/100; 137/315.12; 137/625.18; 137/625.48; 251/367
(58) Field of Search ...................... 137/98, 100, 315.12, 137/625.18, 625.48, 597; 251/367

(56) References Cited

U.S. PATENT DOCUMENTS

| | | | | |
|---|---|---|---|---|
| 3,557,835 A | * | 1/1971 | Heiser et al. | 137/625.48 |
| 5,299,593 A | * | 4/1994 | Ottelli | 137/100 |
| 5,727,587 A | * | 3/1998 | Yang | 137/100 |
| 5,839,471 A | | 11/1998 | Yang | 137/625.18 |
| 5,884,653 A | * | 3/1999 | Orlandi | 137/100 |
| 6,029,687 A | * | 2/2000 | Chang | 137/100 |
| 6,095,176 A | * | 8/2000 | Yang | 137/100 |
| 6,176,250 B1 | * | 1/2001 | Lin et al. | 137/98 |
| 6,182,682 B1 | * | 2/2001 | Chen | 137/100 |
| 6,302,135 B1 | * | 6/2001 | Chung | 137/100 |

* cited by examiner

Primary Examiner—Michael Powell Buiz
Assistant Examiner—Ramesh Krishnamurthy

(57) ABSTRACT

A valve includes a housing having a chamber and two inlets communicating with each other, two casings received in the chamber of the housing and each having a bottom orifice and an upper port and a side aperture communicating with each other. A valve seat is slidably received in the apertures of the casings and has two openings communicating with the inlets of the housing, and a valve member is slidably engaged in the valve seat. A number of sealing members may be easily and solidly engaged between the casings and the housing and a cover for forming an excellent water tight seal.

1 Claim, 2 Drawing Sheets

VALVE HAVING AN EASILY SEALING CONFIGURATION

BACKGROUND OF THE INVENTION

1. Field of the Invention

The present invention relates to a valve, and more particularly to a valve having an easily sealing configuration.

2. Description of the Prior Art

Typical valves, particularly the valves for controlling hot water and cold water, comprise a number of sealing rings for spacing a number of chambers and for forming water tight seal. However, the sealing rings may not be suitably provided for forming excellent water tight seal for the valves.

The present applicant has developed a sealing member for facilitating the sealing engagement of the valve and has been issued as U.S. Pat. No. 5,839,471 to Yang. The sealing member includes a complicated configuration that may not be easily manufactured, and includes a great area that is flexible and that may not be easily assembled onto the housing of the valve.

The present invention has arisen to mitigate and/or obviate the afore-described disadvantages of the conventional sealing members for valves.

SUMMARY OF THE INVENTION

The primary objective of the present invention is to provide a valve having an excellent water tight seal configuration that may be easily manufactured and assembled.

In accordance with one aspect of the invention, there is provided a valve comprising a housing including a chamber formed therein, and including a bottom portion having two inlets formed therein and communicating with the chamber thereof, two casings received in the chamber of the housing and each including a bottom portion having an orifice formed therein for communicating with the inlets of the housing respectively, and each including an upper portion having a port formed therein, and each including a side portion having an aperture formed therein and communicating with the orifices and the ports of the casings respectively, a valve seat slidably received in the apertures of the casings, and including two openings for communicating with the inlets of the housing respectively, and a valve member slidably engaged in the valve seat and including two ports for communicating with the openings of the valve seat and the inlets of the housing respectively.

The upper portion and the bottom portion of the casings each includes a peripheral depression formed therein, and the valve further includes a plurality of sealing rings engaged in the peripheral depressions of the casings.

The housing includes a peripheral wall provided therein for defining the chamber thereof, the casings each includes a peripheral flange laterally extended outward therefrom for engaging with the peripheral wall of the housing.

The casings each includes a chamfered peripheral portion formed around the apertures of the casings respectively.

The valve seat includes two end portions, and two sealing rings engaged on the end portions of the valve seat and engaged between the valve seat and the casings respectively.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
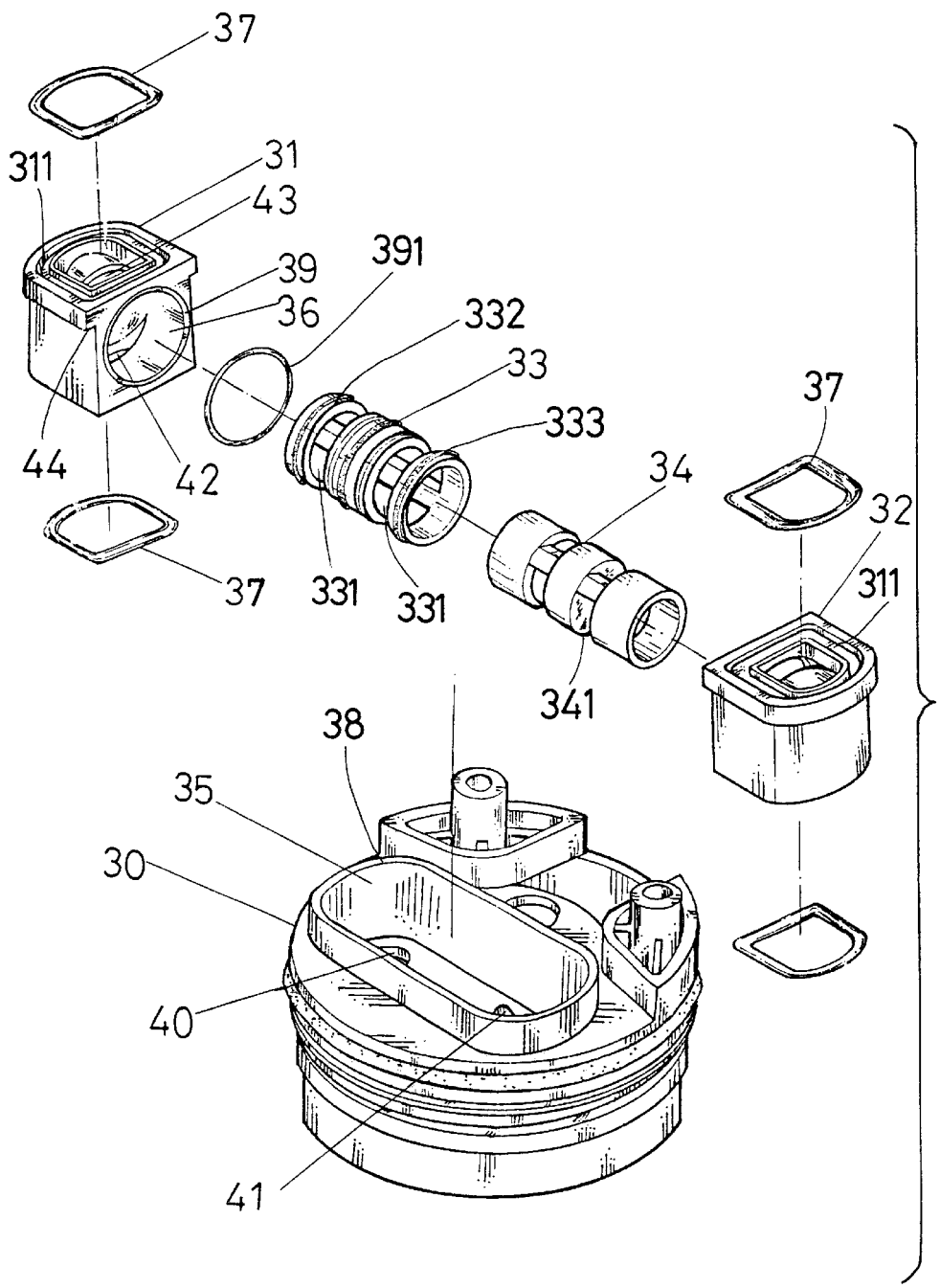
FIG. 1 is an exploded view of a valve in accordance with the present invention.
Figure 2:
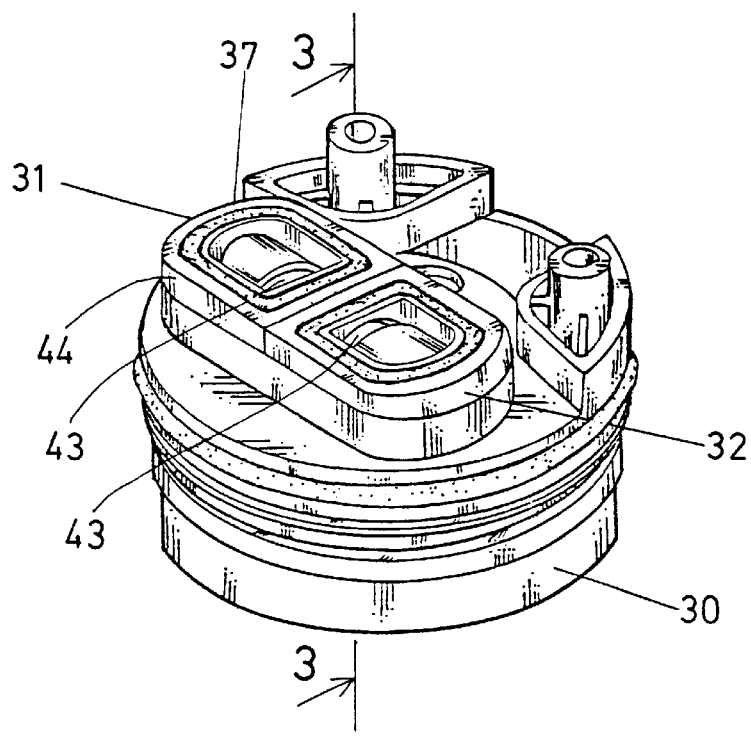
FIG. 2 is a perspective view of the valve.

Referring to the drawings, a valve in accordance with the present invention comprises a housing 30 including a chamber 35 formed therein and defined by a peripheral wall 38, and including two inlets 40, 41 formed therein and communicating with the chamber 35 of the housing 30 and coupled to the hot water and the cold water reservoirs respectively. Two casings 31, 32 are received in the chamber 35 and engaged or contacted with each other (FIGS. 2, 3) and each includes an orifice 42 formed in the bottom thereof and communicating with the inlets 40, 41 of the housing 30 respectively. The casings 31, 32 each includes a side portion having an aperture 36 formed therein and having a chamfered corner or outer peripheral portion 39 formed around the aperture 36 thereof for engaging with a sealing ring 391. The casings 31, 32 each includes an upper portion and a lower portion each having a peripheral depression 311 formed therein for receiving a sealing ring 37 therein each, and each includes a mouth 43 formed on the upper portion thereof and communicating with the apertures 36 and the orifices 42 of the casings 31, 32 respectively. The casings 31, 32 each includes a peripheral flange 44 extended laterally outward therefrom for engaging with the peripheral wall 38 of the housing 30. A cover may be attached onto the housing 30 for enclosing the casings 31, 32. One type of the cover has been disclosed in U.S. Pat. No. 5,839,471 to Yang which is taken as a reference for the present invention.

A valve seat 33 is slidably received in the apertures 36 of the casings 31, 32, and includes two openings 331 communicating with the orifices 42 of the casings 31, 32 and thus with the inlets 40, 41 of the housing 30 respectively (FIG. 3), and includes two sealing rings 332, 333 engaged on the end portions and engaged between the valve seat 33 and the casings 31, 32 respectively. A valve member 34 is slidably engaged in the valve seat 33 and includes two ports 341 for communicating with the openings 331 of the valve seat 33 and the inlets 40, 41 of the housing 30 (FIG. 3).

Figure 3:
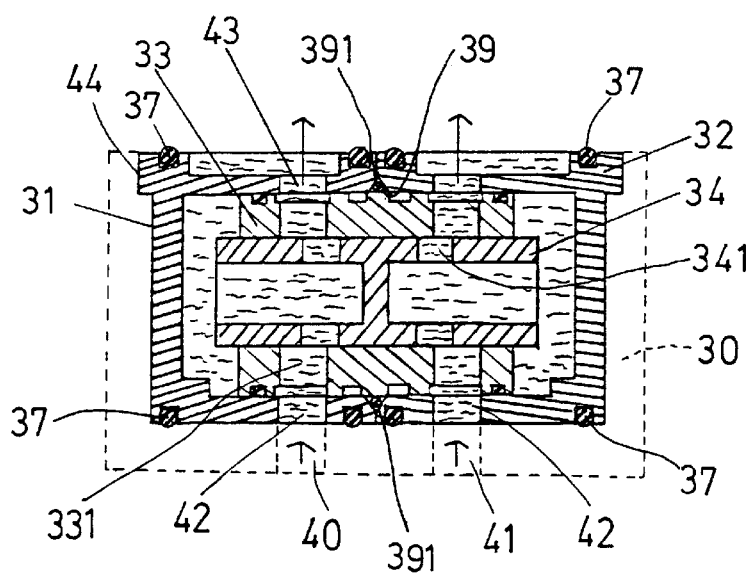
FIG. 3 is a cross sectional view taken along lines 3—3 of FIG. 2.

In operation, as shown in FIG. 3, when the valve member 34 is moved relative to the valve seat 33 to either of the ends of the valve seat 33 to disengage the ports 341 from the opening 331 of the valve seat 33, 32, the water from the inlets 40, 41 of the housing 30 may not flow into the valve. When the valve member 34 is moved toward the middle portion of the chamber 35 for communicating the ports 341 with the openings 331 of the valve seat 33, the water from the inlets 40, 41 of the housing 30 may flow into the valve member 34 via the openings 331 of the valve seat 33 and the ports 341 of the valve member 34 and may flow out through the mouths 43 of the casings 31, 32. The sealing ring 332 may prevent the cold water, for example, from flowing backward into the opening 331 of the valve seat 33. The sealing ring 333 may also prevent the hot water, for example, from flowing backward into the opening 331 of the valve seat 33. The sealing rings 332, 333 may thus form an excellent water tight seal between the inlets 40, 41 of the housing 30 and the cover respectively. The sealing ring 37 may be easily engaged between the casing 31, 32 and the housing 30 and the cover, and may make an excellent water tight seal between the inlets 40, 41 of the housing 30 and the openings 331 of the valve seat 33. The operation of the valve has been disclosed in U.S. Pat. No. 5,839,471 to Yang which is taken as a reference for the present invention.

It is to be noted that the sealing rings 37 may be easily and quickly and solidly engaged in the casings 31, 32 and engaged between the casings 31, 32 and the housing 30 and the cover. The members of the valve may be easily manufactured and assembled.

Accordingly, the valve in accordance with the present invention includes an excellent water tight seal configuration that may be easily manufactured and assembled.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A valve comprising:

a housing including a chamber formed therein, and including a bottom portion having two inlets formed therein and communicating with said chamber thereof, said housing including a peripheral wall provided therein for defining said chamber thereof, two casings received in said chamber of said housing and each including a bottom portion having an orifice formed therein for communicating with said inlets of said housing respectively, and each including an upper portion having a port formed therein, and each including a side portion having an aperture formed therein and communicating with said orifices and said ports of said casings respectively, said upper portion and said bottom portion of said casings each including a peripheral depression formed therein, said casings each including a chamfered peripheral portion formed around said apertures of said casings respectively, and said casings each including a peripheral flange laterally extended outward therefrom for engaging with said peripheral wall of said housing, a plurality of first sealing rings engaged in said peripheral depressions of said casings, for making a water tight seal between said casings and said housing, a valve seat slidably received in said apertures of said casings, and including two openings for communicating with said inlets of said housing respectively, said valve seat including two end portions, a second sealing ring received in said chamfered peripheral portions of said casings, two third sealing rings engaged on said end portions of said valve seat and engaged between said valve seat and said casings respectively, for making a water tight seal between said valve seat and said casings, and a valve member slidably engaged in said valve seat and including two ports for communicating with said openings of said valve seat and said inlets of said housing respectively.

* * * * *